(12) United States Patent
Miller et al.

(10) Patent No.: US 9,817,023 B2
(45) Date of Patent: Nov. 14, 2017

(54) CONTINUOUS SELFTEST FOR INERTIAL SENSORS AT 0 HZ

(71) Applicant: NXP USA, INC., Austin, TX (US)

(72) Inventors: Todd F. Miller, Scottsdale, AZ (US); Marco Fuhrmann, Mesa, AZ (US); Tom D. Ohe, Tempe, AZ (US)

(73) Assignee: NXP USA, INC., Austin, TX (US)

( * ) Notice: Subject to any disclaimer, the term of this patent is extended or adjusted under 35 U.S.C. 154(b) by 594 days.

(21) Appl. No.: 14/201,544

(22) Filed: Mar. 7, 2014

(65) Prior Publication Data
US 2014/0182351 A1 Jul. 3, 2014

Related U.S. Application Data

(63) Continuation of application No. 12/271,841, filed on Nov. 15, 2008, now abandoned.

(51) Int. Cl.
*G01P 21/00* (2006.01)
*G01P 15/125* (2006.01)

(52) U.S. Cl.
CPC .......... *G01P 21/00* (2013.01); *G01P 15/125* (2013.01)

(58) Field of Classification Search
CPC ................................ G01P 15/125; G01P 21/00
USPC ..... 73/1.37–1.41, 1.75–1.78, 504.02–504.12, 73/514.01–514.38, 1.01
See application file for complete search history.

(56) References Cited

U.S. PATENT DOCUMENTS

| | | | | |
|---|---|---|---|---|
| 6,497,149 B1 * | 12/2002 | Moreau | ................. | G01P 15/125 73/514.32 |
| 7,543,473 B2 * | 6/2009 | Samuels | ................. | G01P 21/00 73/1.37 |
| 2005/0016273 A1 * | 1/2005 | Murata | ................. | G01P 15/131 73/514.32 |
| 2009/0277244 A1 * | 11/2009 | Doll | ....................... | B60T 8/885 73/1.37 |

* cited by examiner

*Primary Examiner* — Hezron E Williams
*Assistant Examiner* — Marrit Eyassu (57) ABSTRACT

A sensor with continuous self test is provided. An exemplary inertial sensor may include one or more self test electrodes so that one or more test signals may be applied to the electrodes during normal operation of the sensor. Normal sensor output may be read and stored during normal operation, when self test signals are typically not applied to the sensor. The normal sensor output provides a baseline for comparison to a sensor offset error detection signal produced when a test signal may be applied to one self test electrode, and also to a sense error detection signal when a test signal may be applied to both self test electrodes.

10 Claims, 9 Drawing Sheets

FIG. 9

CONTINUOUS SELFTEST FOR INERTIAL SENSORS AT 0 HZ

CROSS-REFERENCE TO RELATED APPLICATIONS

This is a continuation of U.S. application Ser. No. 12/271,841, filed Nov. 15, 2008.

BACKGROUND

Field

This disclosure relates generally to integrated sensors, and more specifically, to testing and calibration.

Related Art

Inertial sensors may be used in many applications. They are typically used to detect force in one or more directions, typically forces created by moving objects such as an airplane, train, vehicle or the like. In short, anything that has a mass that can be moved to create inertial forces can typically be measured by inertial sensors. An example application of inertial sensors, is in an automotive safety systems such as air bag systems, anti lock-brakes ("ABS"), vehicle stability controls ("VSC") and the like.

To integrate easily into an electrical system, such as found in a vehicle, inertial sensors may be in the form of electronic circuits. In such circuits, the sensor (or transducer) can be a part of a multichip and sometimes integrated solution in a package. In such electronic circuits, the electrical signal representing the force or motion may be produced by any number of methods. Typically the force measured can cause a change in some fundamental electrical parameter of the integrated circuit, such as capacitance, resistance, transistor gain, inductance, or the like.

Since movement can often occur in such circuits, as well as manufacturing variations, the sensors outputs may vary greatly, or drift during operation. In addition, mechanical forces being measured can be made up of a spectrum of mechanical frequencies. Transducers may respond to the frequencies that make up such a mechanical input signal differently from sensor to sensor. Thus, a transducer may also have a unique frequency response that may also change over time. And also, a given sensor may respond differently or fail after being used for a while. As inertial sensing applications continue to grow, the demands made upon inertial sensors will most likely call for improved and more reliable sensors, and sensor performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Current self test is usually performed at startup, because the sensor is usually not expected to detect an application event when the electrostatic force is engaged and provisions are typically not made to attempt testing at a later time due to the possible presence of an interfering operational signal. With current self test techniques, electrostatic forces may be applied to the transducer during normal operation, which result in an offset at the sensor output. However, without proper techniques, and analysis, this method can cause distortion which can trigger an incorrect action initiated by the sensor. In addition, self test during normal operation with a superimposed stimulus latch-up of the sensor can occur, which can be seen as a catastrophic failure at the device output.

The application of a new continuous self test ("CST") to a sensor can allow the sensor (equivalently termed a device, a transducer, an accelerometer, a g-cell micro-electro-mechanical systems sensor "g-cell", or the like), such as an exemplary accelerometer, to be tested after start up, and while it may be in use. As used in this document "continuous" as used in "continuous self test" means that one or more self test processes are applied over operation of the sensor, typically after start up and during use of the sensor. Thus, a self test is "continuous" in that it may be applied at any time during operation of the sensor, and the self test processes need not be applied constantly during, the operation of the sensor. Individual continuous self test processes may be of a digital or sampled nature, and the various self test processes need not be applied immediately after each other. Individual processes may be applied at various times over the continuous operation of the sensor and may be have discrete timing, which can be asynchronous, clocked, or the like. CST can include modification of the sensor in conjunction with exercising the sensor, typically under the control of a processor, or its equivalent. In the examples described, a sequence of phases can be established to stimulate the sensor that can allow the detection of an error in a transducer while maintaining the normal operation of the sensor, independent of input signal. With the addition of two detection phases (in addition to a normal operating phase) a continuous self test operation mode can allow detection of transducer element errors through a large range of forces ("g's") and substantially any frequency, including 0 Hz. The term g's, generally refer to the measurement of an object's acceleration, or the force that may be impressed on an accelerating object. Such forces may be timed g's, g-force, g-load, or the like. The examples below can be applied in sensing applications that allow electrostatic actuation of the transducer element and the like. Such force detecting sensors may include micromechanical detecting elements that may be stimulated, or otherwise exercised by the application of test signals to specially supplied electrodes.

Sensors and accelerometers that can include continuous self test may be fabricated by conventional micro-electromechanical systems ("MEMS") techniques, or other equivalent methods. Sensors fabricated by the MEMS technique to include continuous self test may be termed MEMS sensors having CST. In particular, the portion of the device that may include force sensing elements may be termed the g-cell. MEMS sensors including those with CST may be used in automotive electronics, medical equipment, smart portable electronics (such as cell phones, PDAs, hard disk drives, computer peripherals, wireless devices), and the like. In particular, MEMS (and other) sensors with CST may be used in automotive, medical, and other applications or devices where reliability may be of concern.

Figure 1:
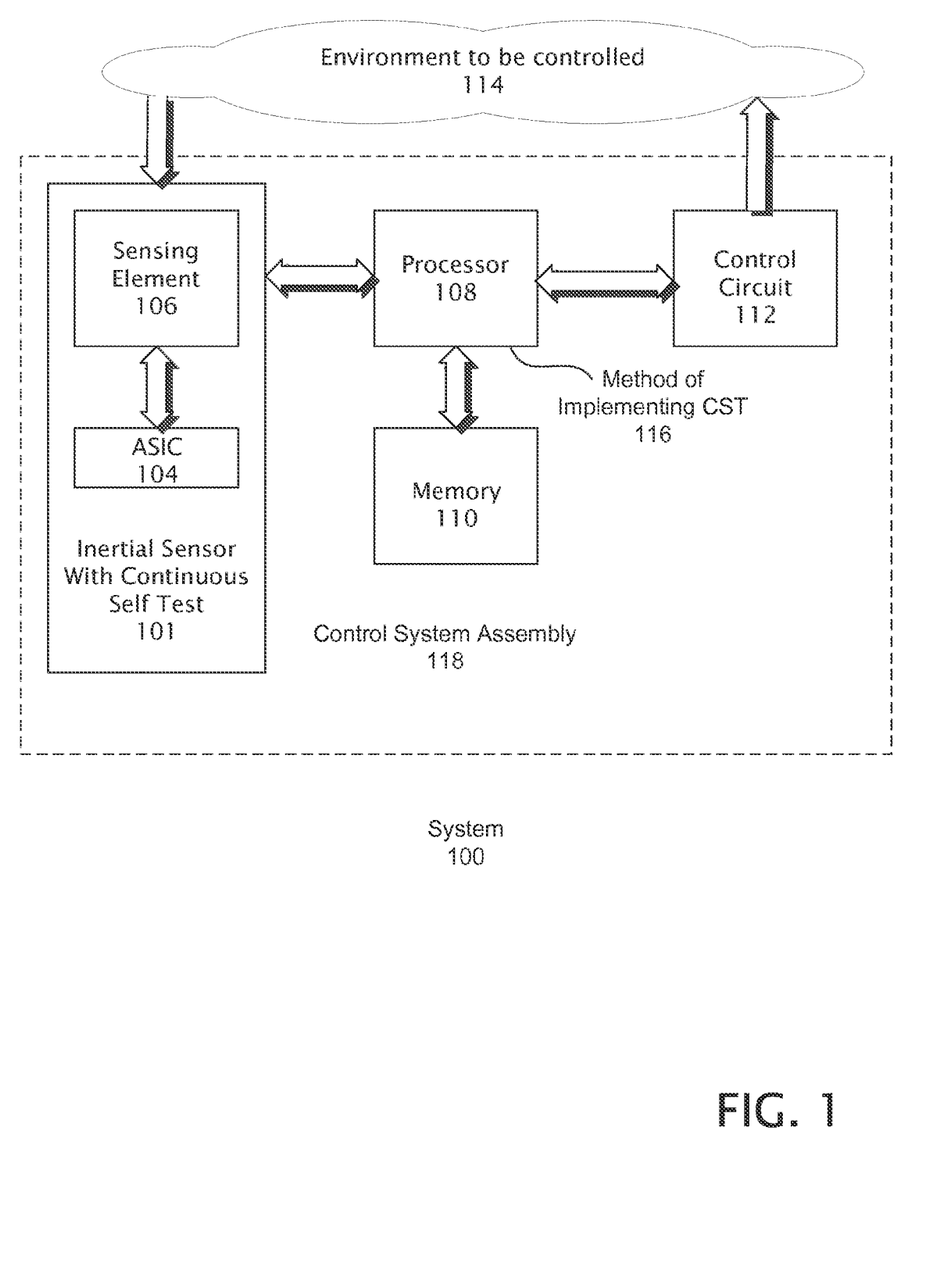
FIG. 1 shows a sensing system including an inertial sensor with continuous self test.

FIG. 1 shows a sensing system 100 including an inertial sensor with continuous self test 101. The inertial sensor with continuous self test 101 typically includes circuitry for implementing one or more self test processes, and may include control circuitry constructed to execute or partially execute, the processes described below. Exemplary sensing systems 100 may include those for deploying air bags, systems for detecting changes in wheel speed, and the like. In the general system described 100, there may be an environment to be controlled 114. The inertial sensor (or equivalently any measurement device that can use electrostatic voltages to provide a measurement) with continuous self test 101 may be coupled to the environment to be controlled 114 in order to receive stimulus signals from it.

The inertial sensor with continuous self test 101 may include a sensing element 106 such as an exemplary, pressure sensor, accelerometer, inertial sensor, or g-cell operating in cooperation with a processing device which may include an exemplary ASIC 104, other associated signal processing circuitry, processor or the like. Such an inertial sensor with CST 101 may be assembled as an integrated circuit ("IC"), hybrid circuit, printed wiring assembly, or the like. An exemplary sensor 101 can be provided as an IC disposed in a conventional small outline integrated circuit ("SOIC") package, or the like. The inertial sensor with continuous self test 101 may provide a self test of the g-cell 106 even while under the influence of the environment to be controlled 114 after initial start up.

The sensor 106 typically includes electro-mechanical assemblies (g-cell or the like) and electronic circuitry that may be included with the sensor. The processing device 104 may be conventionally constructed to implement CST and other signal processing, or conditioning functions.

The inertial sensor with continuous self test 101 may also be coupled to additional control circuitry that may include off chip processing provided by a processor, or its equivalent 108, working in cooperation with a memory 110. In alternative examples the circuit functions provided by the processor 108 and memory 110 may be included in the inertial sensor with continuous self test 101 provided the ASIC 104 is suitably configured. In further alternative examples, analog or other digital circuitry may be equivalently substituted for the processor and memory. The processor 108 typically receives data from the inertial sensor with continuous self test 101, and can process the data for suitable application to a control circuit 112 coupled to the processor 108. The inertial sensor with CST 101 may be provided as an IC disposed in a module. The printed wiring board ("PWB") or assembly 118 may include circuit functions suitable for interfacing with an inertial sensor with CST to implement functions such as controlling or activating CST functions (or modes of operation), airbag deployment, or the like.

Processing may be aided by a software program implementing or otherwise controlling application of the CST method 116 and running on the processor 108. The processor 108 can be used to coordinate and execute the overall CST process, while some localized processing or execution of functions may be provided within the internal sensor with continuous self test (ASIC 104). Alternatively, the CST method may be executed by the control circuit constructed as a dedicated processing element such as a DSP or the like. The processor 108 and memory 110 can be conventionally constructed. The control circuit 112 conditions the output of processor 108 coupled to it to produce a signal, or signals, suitable to control the environment 114 and the inertial sensor with CST 101. Control of the environment may include verification of sensor operation prior to actuating the control circuit 112, such as actuating an airbag system.

An example of such a system 100 may be the use of MEMS sensors with CST 101 in automotive air bag safety systems. Here, an end user producing an airbag system, including a MEMS sensor with CST may wish to provide failsafing, or other reliability measures to ensure proper operation of the air bags. An IC typically providing CST outputs/inputs 101 may be used in conjunction with additional circuitry, typically on a PWB 118, to provide failsafing and other features.

Customers that may use automotive inertial sensors may wish to include failsafing in a system 100. Failsafing is generally a term that can refer to redundancy of components, or to detection of faults. The current self test techniques available typically do not allow continuous monitoring of the transducer element after startup. A MEMS sensor with CST 101 may allow for the provision of failsafing in a sensing system 100 having a sensor with continuous self test 101, after start up. As part of a comprehensive failsafing system, continuous self test may be provided in automotive inertial sensor applications and the like. Failsafing may be provided by circuitry constructed to utilize the continuous self test capabilities available from the sensing element 106.

Continuing with the exemplary airbag system 100, the environment to be controlled 114, may be an automobile crash, where the inertial sensing systems 101 detects a change in acceleration indicative of a crash or other event. Output of the sensing element 106, working in cooperation within the ASIC 104, tends to be without false triggering due to the provision of CST. CST ensures that the sensor is working prior to the crash event. In other applications such as rollover detection CST may be used in real time during the event. The output of the inertial sensor 101 may be applied to processor 108, and memory 110 for processing and application to the control circuit 112. The processor 108 may address the inertial sensor with CST 101, by cycling the phases applied to the inertial sensor 101, and evaluating the output. In one example the control circuit 112 is can be part of an air bag assembly that can operate under control of the processor 108 to deploy the airbags to protect those in the vehicle. With CST being part of the inertial sensor 101 more reliable and accurate deployment of the airbags in an airbag safety system 100 can be provided.

An exemplary MEMS sensing element including continuous self test 106 may be fabricated by surface micromachining. In surface micromachining, the MEMS sensor can be conventionally formed on top of a wafer with thin film materials disposed thereon. The top layers may consist of structural materials forming the sensor and sacrificial layers that can be used to define gaps between the structural layers. The remaining material may move, allowing motion to be detected. Many surface micro-machined sensors use a capacitive transduction method to convert an input mechanical signal (motion or acceleration) to an equivalent electrical signal. In the capacitive transduction method, the sensor can be considered to be a mechanical capacitor in which one or more of the plate's moves with respect to the applied physical stimulus. The change in capacitance can thus, be considered the electrical equivalent of the input mechanical stimulus. The provision of additional plates or electrodes in the sensing element 106 can provide electrical signals for use in providing CST. The sense plates themselves also provide for CST, but with a different front end.

Figure 2:
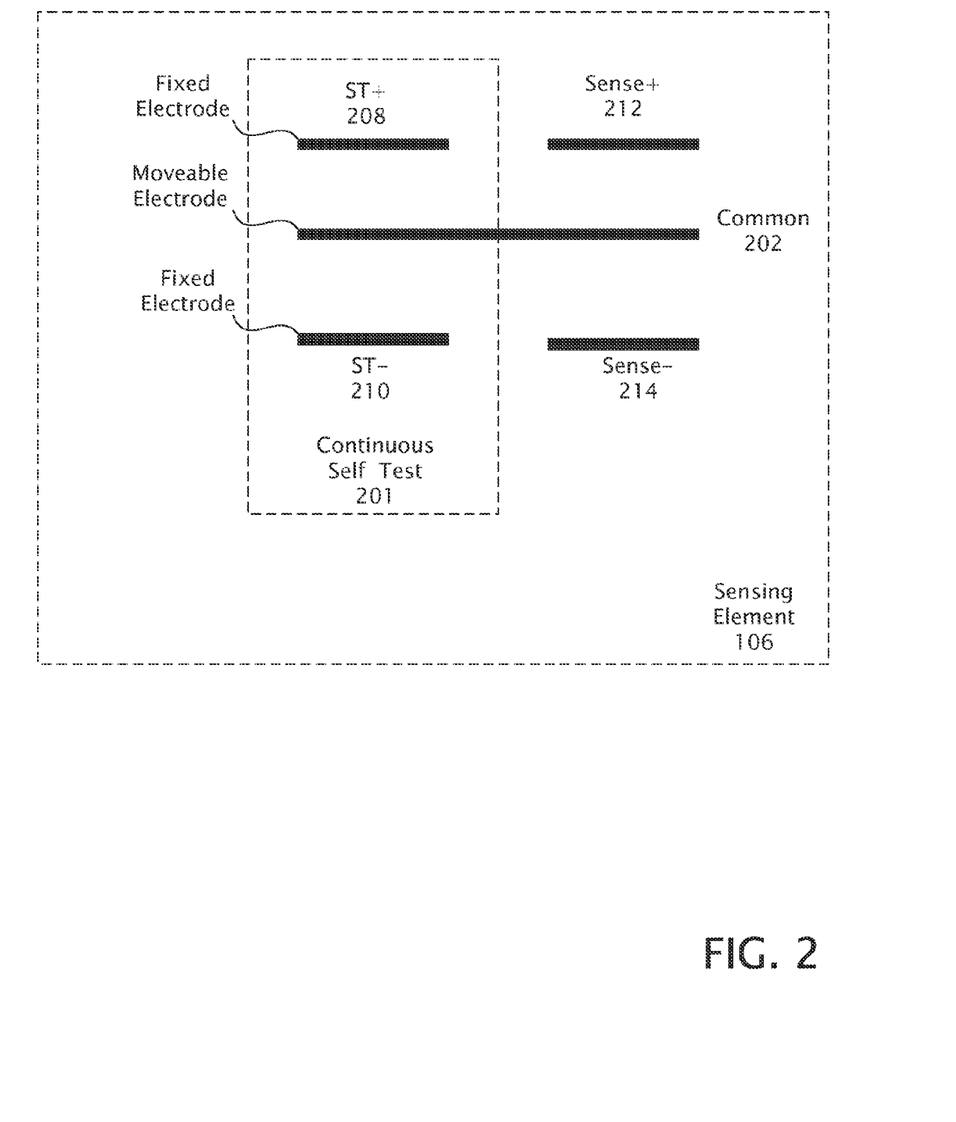
FIG. 2 is a diagram showing the sensing element of an inertial sensor with continuous self test.

FIG. 2 is a diagram showing the sensing element 106 of an inertial sensor with continuous self test 201. The inertial CST sensor electrode arrangement 201 can allow for providing continuous self test by an integrated circuit. Inertial sensors 106 may be used to detect motion in one or more directions, such as exemplary linear accelerations in x, y, or z directions. Accordingly, the sensors may be configured to measure forces in one or more directions. And, CST sensor electrodes may be provided in each direction. Sensors 106 with CST 201 used in such applications may typically be provided as integrated circuits in an effort to improve reliability, performance, economy, and the like. The g-cell may include one or more moveable capacitor plates 202 to measure g-force, fixed electrodes for self test 208, 210 and sensor plates 212, 214. Coupling of the electrodes to an external circuit (typically via an ASIC) typically allows passage of conventional signals but also allows access to the plates and electrodes 208, 210, 212, 214. The inertial sensor assembly with CST 106 may be disposed in a conventional integrated circuit package and it may be electrically coupled to external circuitry such as a PWB (118 of FIG. 1), typically through a conventional techniques, so that self test may be controlled.

In an exemplary implementation of a surface micromachined integrated circuit accelerometer, silicon, or an equivalent material, may be selectively etched to form fixed electrodes 208, 210 with a movable electrode 202 between. Movement can cause a displacement of the movable electrode, causing a change of capacitance in the two back to back capacitors formed (208 and 202, 210 and 202) in this electrode arrangement. This plate arrangement provides signals indicative of an applied g-force.

When the center plate 202 deflects, the distance from it to one of the fixed plates 208, 210 can increase by the same amount that the distance to the other plate decreases. The change in distance is a measure of acceleration. As the center plate moves when sensing acceleration, the distance between the plates changes, and each capacitor's value will change, ($C=A\in/D$). Where A is the area of the plate, $\in$ is the dielectric constant, and D is the distance between the plates. In alternative examples there may be uni-directional and/or bi-directional self test plates for use in implementing CST. Self test plates 208, 210 are provided for CST and may be termed an offset error self test plate, or electrode, and a sense error self test plate or electrode. The plates can be one or more additional plates provided that can establish a capacitance between the middle or common plate 202 and the self test plates 208, 210. The provision of one self test plate is an example of a unidirectional self test plates. In an alternative bi-directional example having two self test plates for a sense mode of CST, there may be a positive self test plate, and a negative self test plate.

MEMs sensors with continuous self-test plates 208, 210 can provide verification of the mechanical and electrical integrity of the accelerometer at any time, before or after, installation. Continuous self test may be useful in heightened reliability applications such as, the exemplary automotive airbag system where system integrity can be ensured over the life of the vehicle.

When an exemplary logic high is input to the self test pin of the sensor IC or equivalent digital mode in the sensor IC is entered, a calibrated potential can be applied across the self-test plate (208 or 210) and the moveable plate 202. The resulting electrostatic force can cause the center plate 202 to deflect. The resultant deflection is measured by the accelerometer's control ASIC, (104 of FIG. 1), as a proportional output voltage results. This procedure can assure that both the mechanical (g-cell) and electronic sections of the inertial sensor (101 of FIG. 1) are functioning. In an alternative embodiment of continuous self test plates, the fourth plate (208 or 210) may be omitted, as the self test plate (208 or 210) and sense plate (212 or 214) functions may be combined with only minor modifications made to the appropriate system sensor transfer function to account for this combination. Other combinations of stimuli, or phases, can be applied to one or more self test plates to produce various responses to implement CST. In particular, the normal phase, the error detection phase, and its offset error detection shown may be provided.

Figure 3:
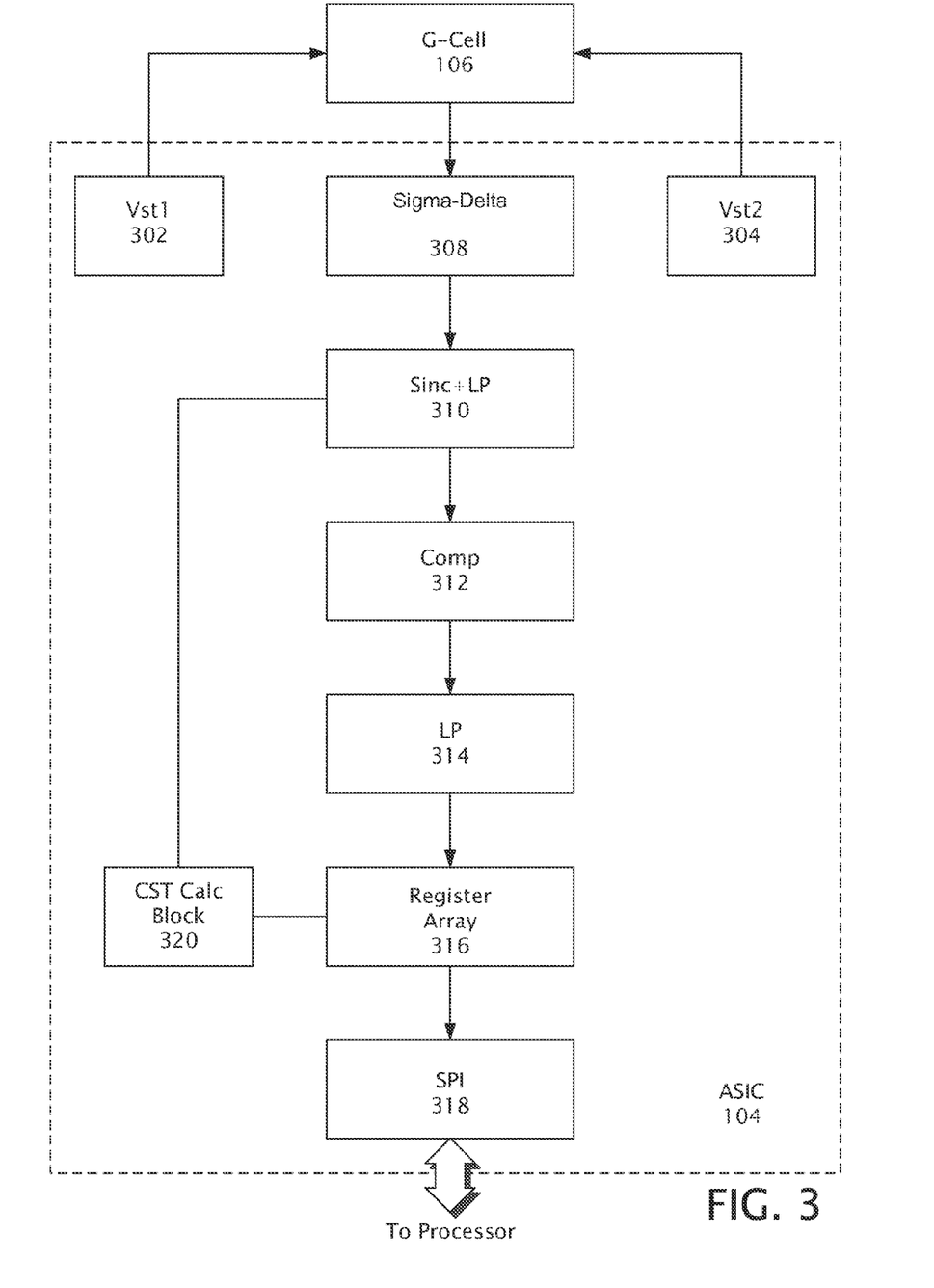
FIG. 3 is a block diagram of an inertial sensor with continuous self test.

FIG. 3 is a block diagram showing further detail of an ASIC in an inertial sensor with continuous self test. The diagram shows the operation of the g-cell 106, in conjunction with the ASIC 104. The ASIC is a dedicated processor, typically implemented in hardware to provide specific processing functions which may include various circuit functions 302, 304, 308, 310, 312, 314, 316, 318, 320 that can be provided in CMOS or other equivalent circuit implementations. The ASIC can provide dedicated circuit processing of the CST signals from the g-cell 106, as well as providing CST stimulus signals 302, 304 to the g-cell 106 according to the test phases typically applied under direction of an external controller (108 of FIG. 1). An external controller can provide control flexibility as it may be programmed with software, while the ASIC, or dedicated processor, may provide more dedicated processing with limited memory (as often provided by storage registers). In the example provided control and implementation of a process for providing continuous self test can be shared to varying degrees between the ASIC and an external controller with distribution of processing typically decided by typical engineering considerations such as a trade off of speed for flexibility, or the like. However, this implementation is not intended to be limiting. In alternative examples all of the processing may be provided on chip in an ASIC, ASIC/onboard processor, or the like. In a further alternative example all of the processing may be provided off of a chip by a computer, microprocessor or the like typically being directed by conventional programming techniques.

Test stimulus to the g-cell 106 can be provided by coupling test signals Vst1 302 and Vst 2 304 to the g-cell 106. Test signals 302, 304 are typically analog voltages selected to provide a desired result when applied during CST phases. Pulse Width Modulated input signals can also be used, alternatively, digital signals can be used as well. Both types of signals may represent an equivalent voltage to the sensor. The voltages 302, 304 may be externally supplied through an IC pin (ball grid array pad or the like), or may be generated internally by conventional methods, typically in response to a logic or similar control signals applied to IC pins.

The g-cell element 106 may be a conventionally formed MEMS sensor or equivalent constructed by various processes and materials including CMOS, poly-silicon, and the like to include the CST electrodes (202, 208, 210, 212, 214 of FIG. 2). An exemplary sensor that may include CST electrodes is the exemplary Micro-Electro Mechanical Systems ("MEMS") device that may be formed by micromachining, or equivalent processes. The exemplary MEMS device consists of a surface micro machined capacitive sensing element 106 and a CMOS signal conditioning ASIC 104 of FIG. 1) usually contained in a single integrated circuit package.

Inertial sensors operation may be arbitrarily divided into various force, or "g" categories such as low, medium, high and the like depending upon the amount of force to be measured. The CST electrode arrangement may be utilized in each of these and other categories.

The CST calculation block 320 can be a conventionally constructed processing circuit for controlling operation of the inertial sensor IC and processing the CST signals and transfer functions. The CST calculation block may be coupled to the Sinc+LP block 310, and the register array block 316.

In the present example a sigma-delta ("ΣΔ") conversion 308, can be a type of analog-to-digital or conversion characterized by integrating (i.e., Σ) differences (i.e., Δ) by conventional methods. Here, capacitance received from block 106 can be converted to a digital output proportional to the capacitance. The output of the converter 308 may be called a count which is produced by a digitalization of the input voltage from the g-cell. In alternative examples equivalent conversion circuits may be substituted for the sigma-delta conversion.

The sinc filter ("Sinc+LPF") 310 can be a filter that can remove frequency components above a given bandwidth, leaves the low frequencies unaffected, possesses linear phase and the like. The sinc filter is conventionally constructed, and coupled to the sigma-delta conversion block 308.

The compensation block 312 can be conventionally constructed and typically compensates the raw output of the sensor 106. The compensation block may be coupled to the Sin+LP block 310. The compensation is typically provided by trimming of the g-cell for static errors such as sensitivity, offset, linearity, and temperature variation. The compensation provided is usually specific to trimming the data outputted from the g-cell and to make up for the variances that can be found in the signal path. This block can be provided since the performance of the g-cell typically cannot meet product specifications without compensation. However, in alternative examples this block may be omitted for precision g-cells not needing compensation, or for typical g-cells that have looser specifications.

The low pass filter ("LPF") 314 may be provided as a conventional 4-pole switched capacitor low pass filter 314 or the like. The LPF 314 can be coupled to the compensation block 312. The LPF 314 may be used to create the proper precision for digital calculations (i.e., noise reduction). Bandwidth of the LPF 314 may be dictated according to the sample rate of the phases. A Bessel implementation or equivalent can be used because it typically provides a maximally flat response with linear phase. Thus, this filter 314 may tend to preserve pulse shape integrity. Because the exemplary filter 314 is constructed using switched capacitor, or digital design techniques, there is typically no need for external passive components (resistors and capacitors) to set the cut-off frequency.

The LPF 314 is typically provided to reduce the noise in the bit stream. Generally speaking, the only time that a bit stream is present is out of the sigma delta converter 308. The sinc 310 turns the bit stream into a parallel n bit value. No longer a bit stream, but still a digital value the low pass filter 314 can reduce a wide band signal, typically one up to about 10 kHz, and cut it back by about 400 Hz to 50 Hz depending on the application.

A cut off of 50 Hz is an arbitrary or exemplary value, as every customer typically has a different value specified for their use. Cut off, may also depend on the sensor sensitivity. In a low g-force verses a medium g-force application or more importantly, in an air bag verses an electronics stability application sensitivity specifications vary. Airbag applications can use 400 Hz within a variance of approximately 10 to 20 Hz depending on the customer. Electronic stability application, such as rollover detection in a car, would typically utilize a 50 Hz cut off.

The register array 316 typically includes a plurality of registers (CST Sense, CST_Off, and the like) used to store data. The register array may be coupled to the LPF 314 and the CST Calc block 320. Information from the CST calculation block 320 may be stored here for later use. Also, the data in the plurality of registers may be accessed by a user through digital communication (but this is not required for CST implementation) the SPIE 318. The register array may be conventionally constructed.

The serial programmable interface ("SPI") 318 is an exemplary interface circuit that allows an external control circuit (118 of FIG. 1) access to sensor data typically by conditioning an output of the sensing element coupled to it for presentation to a data interface The SPI interface is conventionally constructed and may be coupled to the register array 316. Other interfaces may be provided in alternative examples.

The signal path shown is exemplary; the circuits described above can also be implemented as an analog circuit signal path or the like. In alternative examples processing by other signal processing path configurations are possible too. The signal processing path described above is exemplary only and for a single sensor. Sensing systems (100 of FIG. 1) can have multiple sensors with continuous self test (101 of FIG. 1), and may sense in one or more dimensions, with continuous self test provided for each dimension being sensed.

Figure 4:
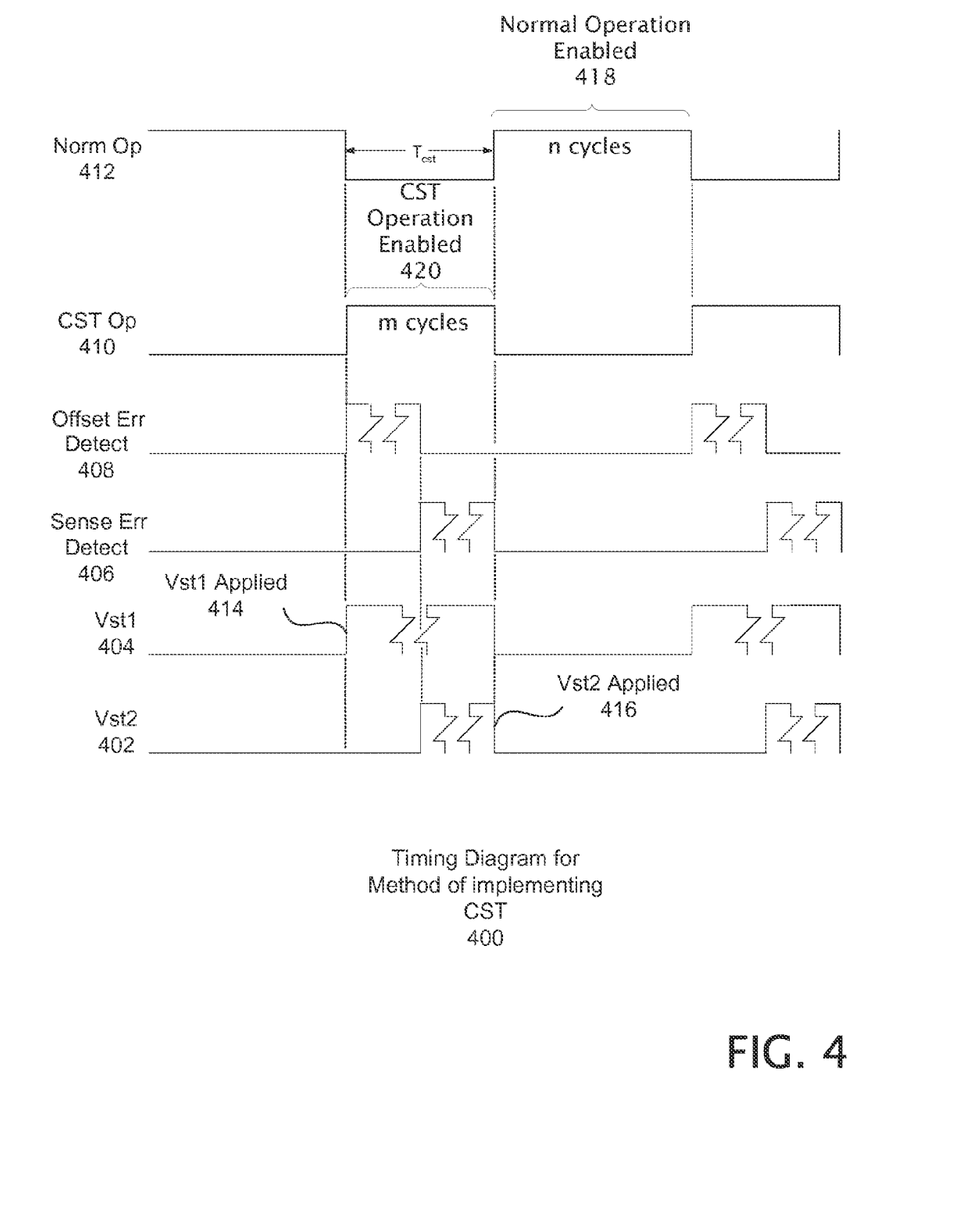
FIG. 4 is a timing diagram showing the relationship between self test voltages and error detection phases applied in a method of implementing continuous self test.

FIG. 4 is a timing diagram 400 showing the relationship between self test voltages 402, 404 and error detection phases 406, 408 applied in a method of implementing continuous self test typically in conjunction with a normal operations mode 412. The timing diagram 400 shows the mutually exclusive operation of normal operation 418 and CST operation mode 420. The normal operation phase 418 typically has stimuli and resulting signals that may originate from g-forces applied to the transducer. Continuous self test (CST) operation can include phases 406, 408 to apply a voltage or voltages 402, 404 to the self test plates. Bi-directional versus uni-directional CST operation is typically dependent on the detection phase request made to the device. The detection phase request is typically configurable through a 4 bit control register, CST_config that is part of the register array (316 of FIG. 3).

The timing and application of the signals shown can be provided by an external processor (108 of FIG. 1). Establishing a sequence of phases can allow the detection of an error in the transducer (101 of FIG. 1), while maintaining normal operation of the transducer by initiating CST operation 408. The two detection phases 406, 408 shown occurring during the continuous self test (CST) operation mode 420 can allow detection of transducer element errors at typically any g-force and any frequency, including 0 Hz.

Thus, no stimulus or signal mode may be left where CST conflicts with the external signal, which can provide true failsafe operation.

In normal operation 412, the self test plate (708, 210 of FIG. 2) voltages, (Vst1 and Vst2) voltages may be maintained at the same potential (or zero potential) as the middle plate (202 of FIG. 2), to produce no effect on the sensor output. In normal operation, this mode may be cycled any number of times (or n cycles) 418 as requested by the controller (108 of FIG. 1). Thus, the device may be run in normal operation mode continuously or up to any number of times.

CST operation 410 may be initiated at any time. Typically during normal operation 412, the CST operation mode may be invoked for m cycles 420. The controller can decide how many cycles may be provided. The number of cycles 420 could be from one to infinity depending upon the system specification or user preference.

When in CST Op mode 410, two errors can be detected, one is an offset error 408 and the other is a sensitivity error 406. The order of determination of these errors 406, 408 may be interchanged. As shown in the exemplary timing diagram 400, the offset error detection 408 can be done prior to sense error detection 406.

In performing offset error detection 408, a voltage can be applied to one of the self test plates 414, to pull the middle plate (202 of FIG. 2) towards one of the sense plates (208 or 210 of FIG. 2), either positive or negative as desired. In a MEMS device, there is typically a square law relationship of voltage, to its distance that the middle plate will travel in distance. Thus, if the middle plate is made to move closer to the sense plate, an increase in capacitance can result. The sensor signal processing path can process the offset signal applied as an increase in capacitive output which can be read by the external controller. Thus, this test may allow an offset, or shift in capacitance from the sensor to be read by the controller. If an offset is not seen, that may indicate a failure in the sensor.

Sense error detection 406 can be performed when offset error detection 408 is not being performed. Here, a voltage 402, 404 can be applied to both self test plates (208 and 210 of FIG. 2). When equal potentials are applied the middle plate (202 of FIG. 2) will not move. However, the spring constant of the MEMS device will have been changed by application of the voltages 402, 404. Typically, the MEMS capacitor is made more sensitive by applying the voltages. The CST Calc Block (320 of FIG. 3) would see a change at the output of the sensor since the gain of the electronic signal path has not changed. For example, if the output was at a count of 300, a jump to a count of 310 or 320 or similar may be read, depending on how much voltage is applied to the plates.

As used in the application, a count is what the customer sees at the output of the digital signal processing chain, typically provided by the ASIC. When applying voltages to both plates Vst1 and Vst2, the effective g-cell spring constant changes, so an output in capacitance from the g-cell tends to increase. So when the self test detection processes are performed (either the offset or the sense), the output of the sensor chip changes. It is assumed that no stimulus (g-shock) has been applied to the g-cell. In other words, the g-cell is in normal operation mode. If a stimulus was applied a change at the output would typically be seen. Flexibility in applying CST is provided so the customer can evoke the detection mode any time. Alternatively a customer may have an independent algorithm, that figures out the proper time to evoke this detection in mode.

Generally speaking, the customer typically does not want the phases to be applied when a g-force stimulus is applied, because raw output, without the g-cell put in some other mode besides normal operation, tends to be most useful. So the m cycles, will typically be less than the n cycles shown. Usually for systems that would use this type of sensor with CST an update rate of about 1 millisecond may typically be ran. And the m cycle should be as short as possible.

Signals Vst1 & Vst2, can be applied either separately or in combination. A stimulus (Vst1 or offset error test voltage) is applied to the one plate for a given time to perform offset error testing 408 and stimulus Vst2, or sense error test voltage, is typically then applied for a portion of the time that Vst1 is applied to perform sense error testing 406.

Figure 5:
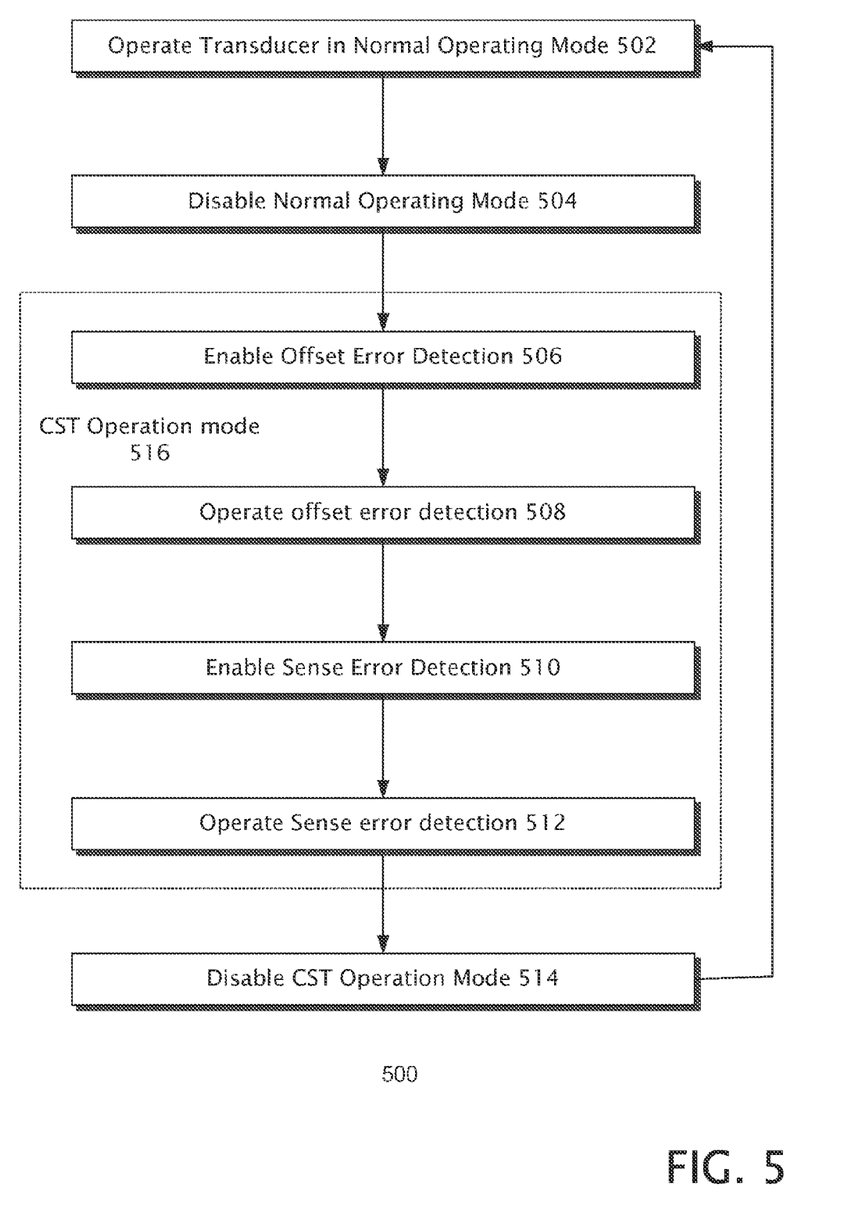
FIG. 5 is a flow diagram showing a process for continuous self test of inertial sensors that includes three phases.

FIG. 5 is a flow diagram showing a process for continuous self test of inertial sensors that includes three phases. The three phases or process for continuous self test of inertial sensors include: a normal operation process 502, a sense error detection process 510, and an offset error detection process 512. The processes may be applied any number of times during operation, and in any combination.

Initially the transducer may be operated in the normal operating mode 502. Next the mode of operation may be changed by disabling the normal operating mode 504. The next mode of operation may be the CST operation mode 516. The CST operation mode may include operation in offset error detection mode 508, and operation in sense error detect mode 512. Offset error detection is enabled 506, and then performed 508. During this test offset error detection 506 may be performed one or more times. Next sense error detection is enabled 510, and performed 512. During this test sense error detection 512 may be performed one or more times. And finally the CST operation mode is disabled 514, and the process may be repeated by returning flow control to operation in the normal operation mode 502.

The process may repeat any number of times and may be performed in any order. In alternative examples CST operation may be performed first. In further alternative examples either offset error detection 508, or sense error detection 512 may be performed individually and without the other test. The provision of CST in the examples shown allow a high degree of flexibility for a customer, or user buying the inertial sensors (101 of FIG. 1) to configure the number of times a test is run, and which tests, and what order to run the tests. In addition each test may be ran a plurality of times, before proceeding to the next test which may be ran a second plurality of times.

Figure 6:
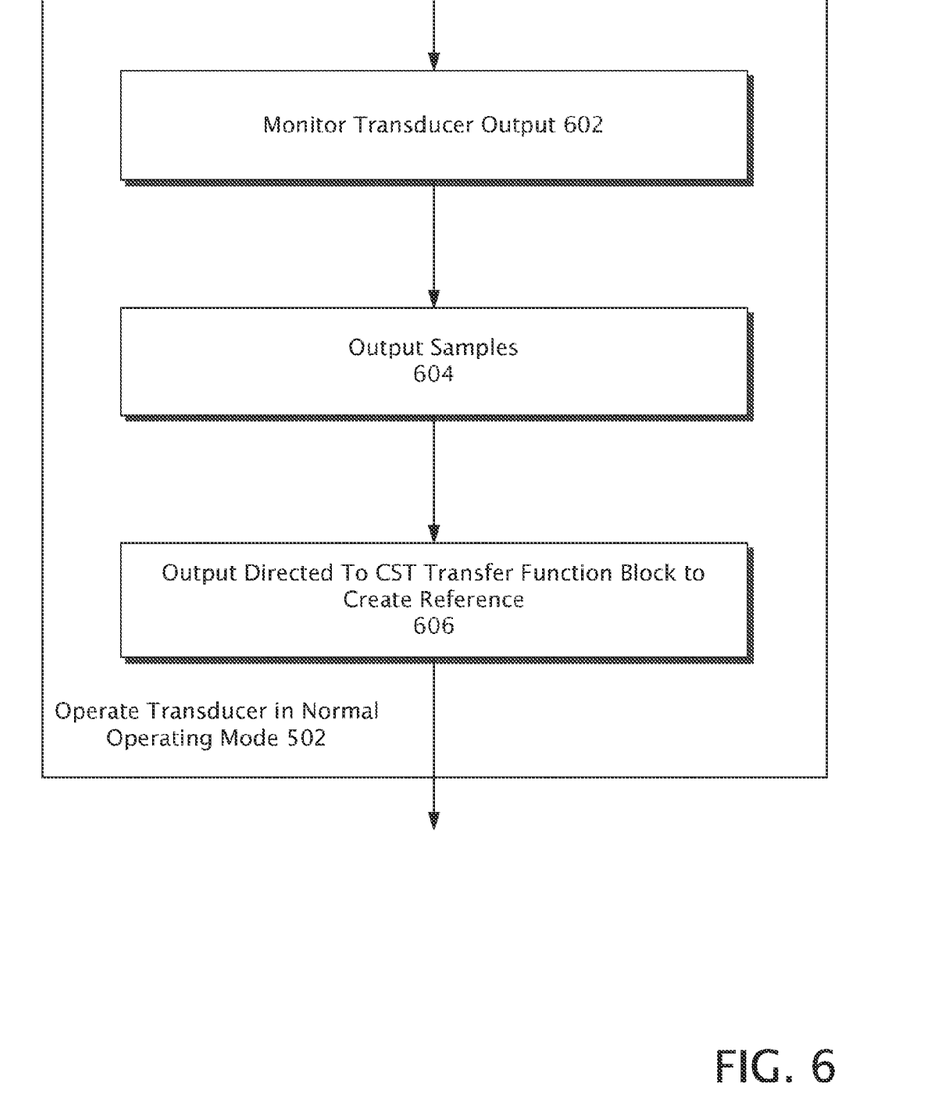
FIG. 6 is a flow diagram showing the first phase process, or normal operating mode for continuous self test of inertial sensors.

FIG. 6 is a flow diagram showing the first phase process, or normal operating mode for continuous self test of inertial sensors 502. At block 602 the transducer output can be monitored. Next at block 604 output samples from the transducer are collected. At block 606 the samples may be presented or coupled to the CST transfer block to create a signal reference, or baseline.

In the normal operation phase, or mode, ("Norm Op phase") 502 the sensor output can be monitored. The normal operational output can be directed through the main signal processing path of the inertial sensor (101 of FIG. 1) where samples can be stored in a register. The register can be read by a processor (108 of FIG. 1) or other equivalent circuitry through the SPI (or equivalent) interface. The processor (108 of FIG. 1) can access this register to use the normal operating sensor output as an input variable (Out Norm Op) for later use in evaluating sensor transfer functions.

Figure 7:
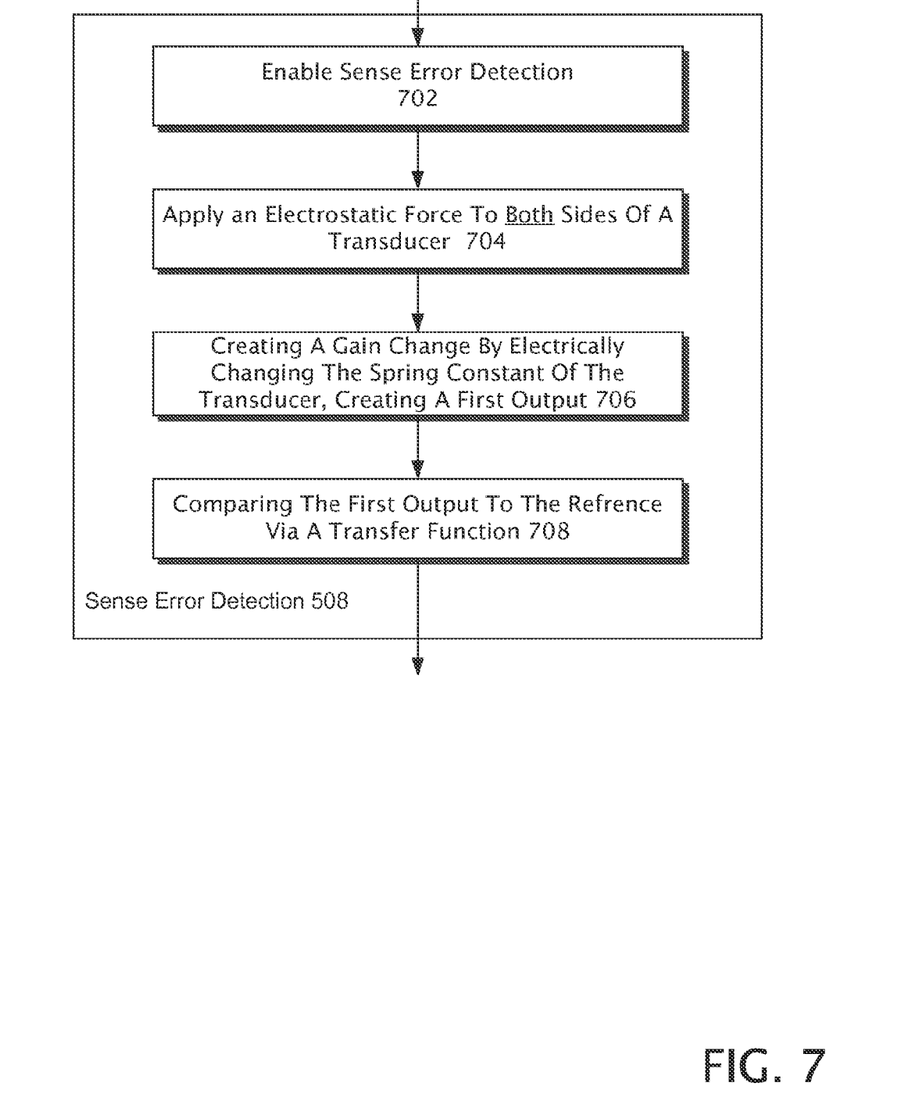
FIG. 7 is a flow diagram showing the second phase process, or sense error detection, for continuous self test of inertial sensors.

FIG. 7 is a flow diagram showing the second phase or process, for sense error detection, for continuous self test of inertial sensors 508. First, sense error detection is enabled 702. Next an electrostatic force can be applied to each side of the transducer self test plates (208, 210 of FIG. 2) 704. At block 706 an output is created for the transducer with the gain change. And finally the sense error detection output can be evaluated as compared to the normal operating output 708. Comparison may be provided by evaluating equation (1).

The sensor error detection phase ("Sense Err Detect Phase") is the real time error (or failure) detection phase. An electrostatic force can be applied to both sides of the transducer self test plates to create a gain change, by electrically changing the effective spring constant of the element. The sensor output can be stored in the register array and processed in the CST block transfer function as described by equation (1). This output is returned to the register array in the CST_Sense register for access by the customer. If the value is nonzero an error has occurred. Changing the electrostatic spring constant in the Sense Err Detect phase, can allow the detection of a change in the sensitivity of the device independent of the stimulus applied to the device. The "k" terms are somewhat arbitrary, as they may depend upon the g-cell, or MEMS structure.

$$CST\_Sense = Out_{Norm\ OP} - Out_{Sense\ Err\ Detect} * LP_{adjust} * (k_{change} + k_{change}^2) \quad (1)$$

Figure 8:
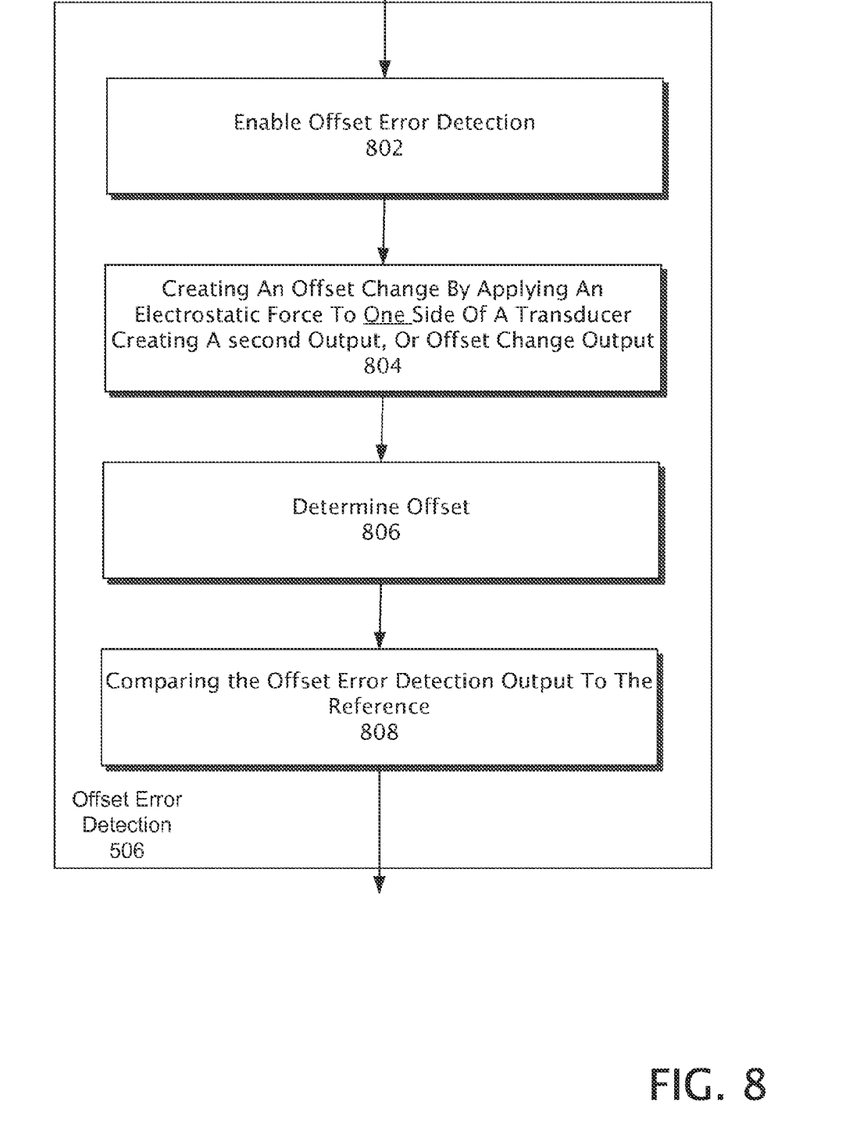
FIG. 8 is a flow diagram showing the third phase process, or offset error detection, for continuous self test of inertial sensors.

FIG. 8 is a flow diagram showing the third phase or process, for offset error detection 505, for the continuous self test of inertial sensors. First the offset error detection process can be enabled 802. Next at block 804 an offset change can be created by applying an electrostatic force to one side of a CST plate. The side stimulated by the CST plate is immaterial. Typically one side, or the other is, stimulated. However, in alternative examples stimulation may be alternated between sides as long as the differing offsets, and other calibration factors that take into account the usage of one plate over the other are accounted for. At block 806 the offset is determined And finally at block 808 the offset error can be compared to the normal operation reference previously stored via utilization of equation (2).

The offset error detection phase ("Off Err Detect phase") is a delayed detection phase, averaged over an arbitrarily chosen number of m cycles. An electrostatic force can be applied to one side of the transducer to create an offset change. The sensor output is processed as described by equation (2). The processor output is stored in a register for access by the customer at register location CST_Off. If the value is nonzero an error has occurred.

$$CST\_Off = Out_{Norm\ Op} - Out_{Off\ Err\ Detect} + Off_{change} \quad (2)$$

The Off Err Detect phase is provided because the Sense Err Detect phase (that biases both plates to change the spring constant) typically does not work for a small window of g's where the sensor gain change cannot be resolved. This window is typically around a natural offset of the transducer element (106 of FIG. 1). The Off Err Detect phase (one plate biased to create an offset) typically cannot solely be used because there is the possibility that an external stimulus can be applied to the transducer matching the applied test stimulus. Another example may be a slow averaging integration, which typically does not allow 0 Hz detection.

Equation (1) and (2) can represent exemplary transfer functions of the CST process. The CST transfer functions can be evaluated after each error detect phase has been set up and applied. The registers can be updated each time new data is available. At any time the customer can validate the behavior of the transducer element of this sensor by examining the CST registers. If no externally applied event (application of g-force) is occurring the customer would typically read the CST_Off register after m periods. If a force application event occurs the CST_Sense register would be read. The equations above may include several correction factors or terms, so that the transfer functions may yield the desired results.

Transfer function CST_Sense (equation (1)) can include correction factors. Due to process variations, test gauge error, and signal processing inaccuracies an error specification can be established for each CST transfer function being evaluated. In the normal behavior of the transducer when a voltage is applied to the plate the voltage will cause a distortion in the plate inversely proportional to the gap between plates. The correction factor for the slope in the CST_Sense transfer function can be represented by $k_{change}$. The CST_Sense transfer function can also adjusted for the roll off of the low pass filter by the term "$LP_{adjust}$". The $LP_{adjust}$ factor may be determined at trim, usually indirectly through oscillator trim, or by direct measurement. In oscillator trim, or trim by direct measurement, electronic trim can be provided by a fuse bit. A conventional error analysis of the signal path can determine the appropriate method.

$LP_{adjust}$ and $OFF_{change}$ compensate for similar manufacturing variations. Here, filter roll off changes from g cell to g cell so $LP_{adjust}$ is supplied to account for each g cell's own variations and account for that variation in the equation to provide a zero for a result when the equation is evaluated.

Transfer function CST_Off can be corrected by the expected offset delta, $Off_{change}$. When there is a difference, or delta, between the normal output and the offset error detect output, a known delta can be obtained. The known delta can be stored in the register, and that's the factor $Off_{change}$. Thus, CST_Off should equal zero if a part is functioning properly when the factor $Off_{change}$ is indicated in the transfer functions. If the g-cell has a problem, when in use, the CST_Off will not equal zero, indicating to the system that there is a problem with the sensor. $Off_{change}$ is included to account for process variation and the like, that can cause each g-cell to be slightly different from others. The difference is typically determined from g-cell to g-cell and stored for use in evaluating the transfer functions. The operation of the phases in providing CST may be better understood by considering the following example.

Figure 9:
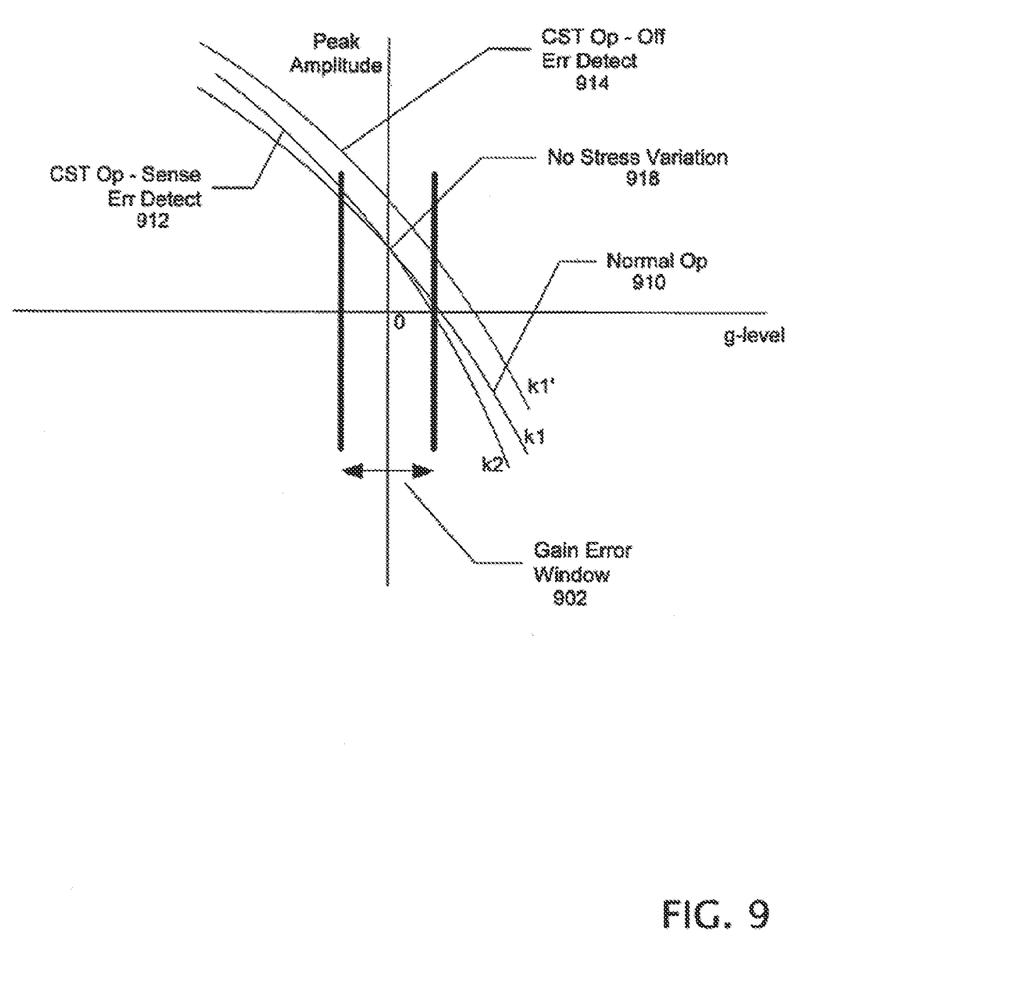
FIG. 9 is a graph showing transducer spring constant changes occurring in the normal operation mode, the sense error detect mode, and the offset error detect mode.

FIG. 9 is a graph showing typical transducer spring constant changes occurring in the normal operation mode 910, the sense error detect mode 912, and the offset error detect mode 914. The horizontal axis is g-level, and the vertical axis shows peak amplitude of voltage or alternatively output capacitance of the g-cell.

The Off Err Detect phase is provided because the Sense Err Detect phase only detects an error outside a certain window 902. As shown, there is some point 918 where spring constants k1 and k2 cross. This crossing point 918 can be dependent on the natural offset of the movable plate due to process, temperature and package variation. For no variation the pivot point 918 may be at 0 g's. The pivot point 918 can move over temperature, but the time constant is typically slow and can be specified for each application.

The smallest gain error window is typically specified based on the individual variation of the devices, and test data. The variation should be kept to a minimum to maximize the real time detection area for the given application.

The following process identifies the behavior of the g-cell relative to results of equation 1 and equation 2:

$CST\_Sense \geq Err_{spec};(CST\_flag=1)$ else if $|average(CST\_Off_{nperiods})| \geq Err_{spec};(CST\_flag=1)$
else CST_flag=0
CST_flag=1 bad g-cell
CST_flag=0 good g-cell.
The examples above provide:
1. A system comprising:
   a sensing element having a continuous self test capability; and
   a processing device directing continuous self test, coupled to the sensing element for providing the continuous self test of the system being performed during normal operation of the system, when g-forces are not present.
2. The system of claim 1 in which normal operation of the sensor is disabled when self test is actuated.
3. The system of claim 1, in which continuous self test occurs in at least one time period of a plurality of time periods during normal operation of the sensor.
4. The system of claim 1, in which the sensing element is an inertial sensor.
5. The system of claim 1, in which the sensing element is a MEMS device having a movable electrode disposed between a pair of fixed electrodes.
6. The system of claim 1, in which the processing device is a dedicated processor.
7. The system of claim 1, in which the processing device is an ASIC.
8. The system of claim 7, in which the processing device includes an interface circuit to format an output of the processing device for presentation to a data interface.
9. The system of claim 1, in which the processing device further includes an offset error generation circuit, coupled to the sensing element, to generate an offset error test voltage.
10. The system of claim 9, in which the processing device further comprises a sense error generation circuit coupled to the sensing element to generate a sense error test voltage.
11. An inertial sensor circuit comprising:
   a sensing element having a movable electrode disposed between a first electrode and a second electrode of a pair of fixed electrodes providing a continuous self test capability; and
   a processing device controlling continuous self test, coupled to the sensing element for directing and providing stimuli for the continuous self test of the system performed at any time while the inertial sensor circuit is operated under normal conditions and, when g-forces are not present.
12. The inertial sensor circuit of claim 11 in which an offset error test signal is coupled to the first electrode to create an offset change output from the sensing element.
13. The inertial sensor circuit of claim 12 in a sensor error test signal is coupled to the second electrode to create a gain change output from the sensing element.
14. The inertial sensor circuit of claim 13 in which the processing device includes a register array for comparing a previously recorded reference signal to the offset change output.
15. The inertial sensor circuit of claim 13 in which the processing device includes a register array for comparing a previously recorded reference signal to the gain change output.
16. A method of providing continuous self test of an inertial sensor comprising:
   operating the sensor in a normal operating mode;
   inhibiting the normal operating mode; and
   operating the sensor in a continuous self test mode at any time during operation of the sensor.
17. The method of providing continuous self test of a sensor of claim 16, in which operating the sensor in continuous self test mode includes creating a reference.
18. The method of providing continuous self test of a sensor of claim 16, in which the continuous self test mode includes operating the sensor in an offset error detection mode.
19. The method of providing continuous self test of a sensor of claim 16, in which the continuous self test mode includes operating the sensor in a sense error detection mode.
20. The method of providing continuous self test of a sensor of claim 16, further comprising comparing an output from the sensor operating during the offset error detection mode and an output from the sensor operating in the sense error detection mode to a reference signal output from the sensor operating in the normal operating mode.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

It is understood that all circuitry described herein may be implemented either in silicon or another semiconductor material or alternatively by a software code representation of functions provided by silicon or another semiconductor material.

What is claimed is:
1. A system comprising:
an inertial sensing element including a movable electrode disposed between first and second fixed electrodes;
a circuit coupled to the first and second fixed electrodes and configured to apply test voltages thereto; and
a processing device coupled to the sensing element and to the circuit, the processing device configured to perform a self test during operation of the system, the self test comprising a sense error detection process during which the circuit applies voltages having equal potentials to the first and second fixed electrodes at the same time to change the spring constant of the inertial sensing element and the processing device monitors an output signal of the inertial sensing element indicative of the change in a gain of the inertial sensing element.

2. The system of claim 1 wherein the circuit is further configured to maintain the first and second fixed electrodes at about the same potential as the movable electrode during operation of the sensor when the self test is not performed.

3. The system of claim 1 wherein the self test occurs in a plurality of time periods interspersed with normal operation of the sensor during which the self test is not performed.

4. The system of claim 1 wherein the self test further comprises an offset error detection process during which the circuit applies disparate voltages to the first and second electrodes and the processing device monitors an output signal of the sensing element indicative of the deflection of the movable electrode.

5. The system of claim 4 wherein the circuit is configured to hold the first voltage applied to the first fixed electrode substantially constant between the offset error detection process and the sense error detection process, while varying the second voltage applied to the second fixed electrode between the offset error detection process and a sense error detection process.

6. The system of claim 1 wherein the processing device is a dedicated processor.

7. The system of claim 1 wherein the processing device is an ASIC in which the circuit is included.

8. The system of claim 7 wherein the processing device includes an interface circuit to format an output of the processing device for presentation to a data interface.

9. The system of claim 1 wherein the first and second fixed electrodes are dedicated self-test plates, wherein the inertial sensing element further comprises a plurality of sense electrodes, and wherein the movable electrode extends between the dedicated self-test plates and at least one spaced-apart pair of the plurality of sense electrodes.

10. The system of claim 1 wherein the processing device further comprises a sense error generation circuit coupled to the inertial sensing element to generate a sense error test voltage.

* * * * *